United States Patent
Hirakawa et al.

(10) Patent No.: US 8,105,653 B2
(45) Date of Patent: Jan. 31, 2012

(54) METHOD AND APPARATUS FOR PERFORMING SURFACE TREATMENT OF RUBBER MEMBER

(75) Inventors: Naoki Hirakawa, Tokyo (JP); Asami Toki, Tokyo (JP)

(73) Assignee: Synztec Co., Ltd., Tokyo (JP)

( * ) Notice: Subject to any disclaimer, the term of this patent is extended or adjusted under 35 U.S.C. 154(b) by 759 days.

(21) Appl. No.: 12/246,042

(22) Filed: Oct. 6, 2008

(65) Prior Publication Data

US 2009/0092758 A1  Apr. 9, 2009

(30) Foreign Application Priority Data

Oct. 5, 2007 (JP) .................................. 2007-262609
Oct. 2, 2008 (JP) .................................. 2008-257880

(51) Int. Cl.
*B05D 3/10* (2006.01)

(52) U.S. Cl. ..................... 427/337; 427/340; 427/407.1; 427/412.1

(58) Field of Classification Search ........................ None
See application file for complete search history.

(56) References Cited

U.S. PATENT DOCUMENTS

2007/0104906 A1  5/2007  Hirakawa et al.
2007/0110936 A1  5/2007  Hirakawa et al.

FOREIGN PATENT DOCUMENTS

| CN | 1983053 | 6/2007 |
|---|---|---|
| JP | 05-158341 | 6/1993 |
| JP | 2003-202722 | 7/2003 |
| JP | 2005-283913 | 10/2005 |
| JP | 2007-031703 | 2/2007 |

OTHER PUBLICATIONS

Thomson Scientific, London, GB; AN 2002-386135 & JP 2001 248443 A (Hokushin Kogyo KK) dated Dec. 18, 2008, Application No. XP002514228.
Thomson Scientific, London, GB; AN 2007-305047 & JP 2007 031703 A (Hokushin Kogyo KK) dated Feb. 8, 2007, Application No. XP002514229.
European Patent Office issued an European Search Report dated Mar. 6, 2009, Application No. 08017489.9.

*Primary Examiner* — Erma Cameron
(74) *Attorney, Agent, or Firm* — Young & Thompson

(57) ABSTRACT

The method for performing surface treatment of a rubber member includes impregnating a rubber member with a first surface-treatment liquid containing an isocyanate component and an organic solvent, to thereby form a first impregnation layer, and sequentially treating a surface of the rubber member, without exposure to air, with a second surface-treatment liquid for partially removing the isocyanate component present in the first impregnation layer.

8 Claims, 8 Drawing Sheets

METHOD AND APPARATUS FOR PERFORMING SURFACE TREATMENT OF RUBBER MEMBER

The entire disclosure of Japanese Patent Applications Nos. 2007-262609 filed Oct. 5, 2007 and 2008-257880 filed Oct. 2, 2008 is expressly incorporated by reference herein.

BACKGROUND OF THE INVENTION

1. Field of the Invention

The present invention relates to a method for treating a surface of a rubber member suitable for a charge-imparting roller, a development roller, a cleaning roller, a toner-supply roller, a toner-regulating roller, an image-transfer roller, an intermediate image-transfer roller, a cleaning blade, a transfer belt, etc., for use in an image-forming apparatus such as an electrophotographic or toner-jet-type copying machine or printer. The invention also relates to apparatus for treating a surface of a rubber member (hereinafter may be referred to as surface treatment apparatus for a rubber member).

2. Background Art

Parts for use in an image-forming apparatus such as an electrophotographic or toner-jet-type copying machine or printer such as a charge-imparting roller, a development roller, a cleaning roller, a toner-supply roller, a toner-regulating roller, an image-transfer roller, an intermediate image-transfer roller, a cleaning blade, and a transfer belt are required to have a suitable conductivity, friction coefficient, and other physical properties and must not stain a contact member including a photoreceptor. Thus, hitherto, such parts made of polyurethane or silicone rubber have been provided with a surface coating layer in order to prevent staining of a contact member such as a photoreceptor and to attain suitable physical properties including charging property.

In recent years, the melting point of a toner binder for use in an electrophotographic copying machine has become lower and lower. In response to this trend, a development roller or a similar member is required to have low hardness so as to provide a sufficient deformation to ensure charging of the toner. Japanese Patent application Laid-Open (kokai) No. 2005-283913 discloses a development roller for satisfying the above requirement. The proposed roller, which includes an elastic layer, a urethane resin coating layer, and a thin layer formed of a hardened isocyanate, maintains softness over the entirety of the roller and has a hard surface.

Formation of a coating layer has a problem in that cumbersome steps are required, thereby increasing production cost. In an attempt to readily solve the problem, Japanese Patent application Laid-Open (kokai) No. 5-158341 discloses an approach including chemically treating a roller surface. Although the chemical treatment is an effective approach, a surface-treated conductive roller tends to have a hard surface. In practical use of a hardness-reduced roller, the surface of the roller is considerably deformed. Therefore, such a roller is required to have resilience in response to deformation. A roller having a hard surface-treated layer has insufficient resilience in response to deformation and may cause damage to an OPC or other members.

SUMMARY OF THE INVENTION

In view of the foregoing, an object of the present invention is to provide a method for performing surface treatment of a rubber member, the method realizing production of a rubber member which has low hardness in response to deformation and which does not cause staining of an OPC and other members and leakage. Another object of the invention is to provide surface treatment apparatus for a rubber member.

Accordingly, in a first mode of the present invention for attaining the object, there is provided a method for performing surface treatment of a rubber member, the method comprises impregnating a rubber member with a first surface-treatment liquid containing an isocyanate component and an organic solvent, to thereby for a first impregnation layer, and sequentially treating a surface of the rubber member, without exposure to air, with a second surface-treatment liquid for partially removing the isocyanate component present in the first impregnation layer.

A second mode of the invention is drawn to a specific embodiment of the surface treatment method of the first mode, wherein the rubber member is immersed in a liquid layer formed of the first surface-treatment liquid, to thereby form the first impregnation layer, and, subsequently, the rubber member is transferred from the liquid layer formed of the first surface-treatment liquid to a liquid layer formed of the second surface-treatment liquid, the two layers forming separate phases.

A third mode of the invention is drawn to a specific embodiment of the surface treatment method of the second mode, wherein the rubber member is immersed in the first surface-treatment liquid, a liquid layer formed of the second surface-treatment liquid is provided on the liquid layer formed of the first surface-treatment liquid, and the rubber member is drawn up through the second surface-treatment liquid.

A fourth mode of the invention is drawn to a specific embodiment of the surface treatment method of any one of the first to third modes, wherein the organic solvent is a polar aprotic solvent.

A fifth mode of the invention is drawn to a specific embodiment of the surface treatment method of any one of the first to fourth modes, wherein the second surface-treatment liquid is a non-polar solvent.

A sixth mode of the invention is drawn to a specific embodiment of the surface treatment method of any one of the first to fifth modes, wherein, after treatment with the second surface-treatment liquid, the rubber member is impregnated with a third surface-treatment liquid for forming a second impregnation layer, and a surface of the rubber member is sequentially treated, without exposure to air, with the second surface-treatment liquid.

A seventh mode of the invention is drawn to a specific embodiment of the surface treatment method of any one of the first to fifth modes, wherein, after treatment with the second surface-treatment liquid, a surface of the rubber member is sequentially treated with a fourth surface-treatment liquid for partially removing the isocyanate component present in the first impregnation layer.

An eighth mode of the invention is drawn to a specific embodiment of the surface treatment method of the sixth mode, wherein the third surface-treatment liquid contains at least one element selected from among an isocyanate compound, a conductivity-imparting material, an acrylic fluoropolymer, and an acrylic silicone polymer.

In a ninth mode of the present invention, apparatus for treating a surface of a rubber member, the apparatus being adapted for use where a rubber member is immersed in a first surface-treatment liquid containing an isocyanate component and an organic solvent and subsequently a surface of the rubber member is treated while the rubber member is transferred from the first surface-treatment liquid to a second surface-treatment liquid, the two liquids forming separate phases, wherein the apparatus comprises a container for receiving the first surface-treatment liquid and the second surface-treatment liquid in a phase-separated state, and means for discharging at least the surface-treatment liquid forming the upper liquid layer to the outside of the container.

In a tenth mode of the present invention, there is provided apparatus for treating a surface of a rubber member, the apparatus being adapted for use where a rubber member is immersed in a first surface-treatment liquid containing an isocyanate component and an organic solvent and subsequently a surface of the rubber member is treated while the rubber member is transferred from the first surface-treatment liquid to a second surface-treatment liquid, the two liquids forming separate phases, and from the second surface-treatment liquid to a third surface-treatment liquid, the two liquids forming separate phases, wherein the apparatus comprises a container having a separator plate extending upward from the bottom of the container to a certain height which is lower than the height of the container, the separator plate being provided for dividing a lower section of the container into two parts and for receiving the first surface-treatment liquid and the third surface-treatment liquid in a phase-separated state, the container being provided for receiving a second surface-treatment liquid on the first and third surface-treatment liquids, and means for discharging at least the surface-treatment liquid forming the upper liquid layer to the outside of the container.

An eleventh mode of the invention is drawn to a specific embodiment of the apparatus for treating a surface of a rubber member of the ninth or tenth mode, which further includes means for introducing into the container the surface-treatment liquid discharged through the discharging means.

According to the present invention, there can be provided a rubber member which has a low hardness in response to deformation and which does not cause staining of an OPC and other members and leakage.

BRIEF DESCRIPTION OF THE DRAWINGS

Various other objects, features, and many of the attendant advantages of the present invention will he readily appreciated as the same becomes better understood with reference to the following detailed description of the preferred embodiments when considered in connection with the accompanying drawings, in which.

DETAILED DESCRIPTION OF PREFERRED EMBODIMENTS

Figure 1A:
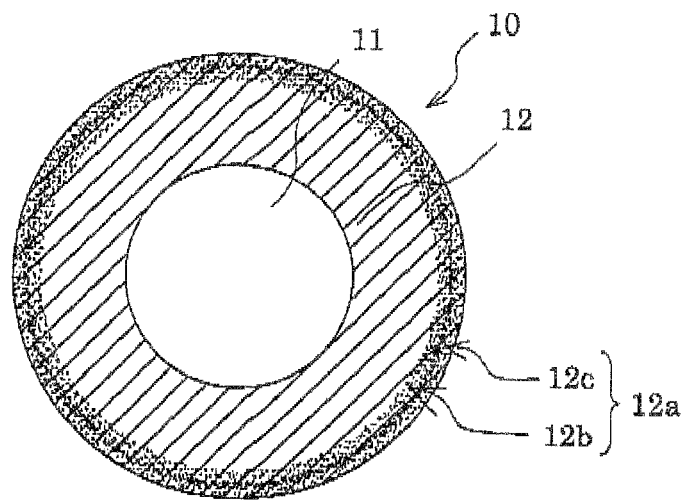
FIGS. 1A to 1D are cross-sections of a rubber roller produced through the method of the present invention for performing surface treatment of a rubber member.

The method of the present invention for performing surface treatment of a rubber member includes impregnating a rubber member with a first surface-treatment liquid containing an isocyanate component and an organic solvent, to thereby form a first impregnation layer, and sequentially treating a surface of the rubber member, without exposure to air, with a second surface-treatment liquid for partially removing the isocyanate component present in the first impregnation layer. According to the surface treatment method, the first surface-treatment liquid contained in rubber member does not evaporate, whereby the entire surface of the rubber member can be uniformly treated with the second surface-treatment liquid.

Through a procedure including impregnating a rubber member with the first surface-treatment liquid to form a first impregnation layer, partially removing the isocyanate component present in the first impregnation layer by use of the second surface-treatment liquid, and drying and curing, a surface-treated layer is formed integrally in a surface portion of the rubber member. In the surface-treated layer including an upper portion and a lower portion, the upper portion has a density of the isocyanate component which is greater on the inner side than on the surface side within the upper portion, and the lower portion has a density of the isocyanate component that gradually decreases inwardly.

In other words, the method of the present invention for performing surface treatment of a rubber member realizes production of a rubber member having a surface-treated layer which includes a lower layer for preventing leakage and bleeding of contaminants from the inside of the member and regulating electrical resistance, the lower layer having been already realized in the art, and an upper layer having a suitable low hardness. Thus, the rubber member produced through the method of the invention for performing surface treatment of a rubber member has low hardness in response to deformation and which does not cause staining of an OPC and other members and leakage.

As mentioned above, the method for performing surface treatment of a rubber member includes impregnating a rubber member with a first surface-treatment liquid containing an isocyanate component and an organic solvent, to thereby form a first impregnation layer, and sequentially treating a surface of the rubber member, without exposure to air, with a second surface-treatment liquid for partially removing the isocyanate component present in the first impregnation layer. In one embodiment of the surface treatment of a rubber member, a rubber member is immersed in a liquid layer formed of a first surface-treatment liquid, to thereby form a first impregnation layer, and the rubber member is transferred from the liquid layer formed of the first surface-treatment liquid to a liquid layer formed of a second surface-treatment liquid, the layers forming two separate phases (hereinafter the process may be referred to as phase a "separated-phase treatment"). Through transferring the rubber member from the first surface-treatment liquid layer to the separated second surface-treatment liquid layer, the rubber member can be sequentially surface-treated without exposure to air through a simple operation.

In the case where such separated-phase treatment is performed, a first surface-treatment liquid and a second surface-treatment liquid having low compatibility with the first surface-treatment liquid are employed to form separate phases. The first surface-treatment liquid may form either an upper liquid layer or a lower liquid layer. The first surface-treatment liquid may have a specific gravity smaller or greater than that of the second surface-treatment liquid. However, preferably, the first surface-treatment liquid employed has a specific gravity greater than that of the second surface-treatment liquid, to thereby provide a lower liquid layer formed of the first surface-treatment liquid. In this case, a rubber member is immersed in the first surface-treatment liquid, and the second surface-treatment liquid layer is provided on the first surface-treatment liquid layer. Then, the rubber member is drawn up through the second surface-treatment liquid, whereby surface treatment can be sequentially performed in a simpler manner without exposure to air. Through this procedure, during pulling up of the rubber member, the surface of the rubber member is treated with the second surface-treatment liquid as if the surface matter of the member were wiped off with the liquid. Thus, an excessive isocyanate component deposited on the surface of the rubber member is removed and, in some cases, the isocyanate component present in the first impregnation layer is partially and uniformly removed. The surface-treatment procedure differs from a conventional surface treatment in which an excessive isocyanate component is wiped off with a sponge or by a similar means after impregnation of a rubber member with the isocyanate component. That is, the first surface-treatment liquid contained in the rubber member does not evaporate, and the second surface-treatment liquid comes into uniform contact with the surface of the rubber member, whereby the entire surface of the rubber member can be uniformly treated.

However, the method for performing surface treatment of a rubber member is not limited to the separated-phase treatment. In another embodiment, a rubber member is immersed in a first surface-treatment liquid, and a second surface-treatment liquid is sprayed onto the rubber member during drawing up of the rubber member from the first surface-treatment liquid, whereby the surface of the rubber member can be sequentially treated without exposure to air. Notably, spraying of the second surface-treatment liquid is preferably performed in dry air or under inert gas (e.g., nitrogen or argon), since reaction between an isocyanate compound and water contained in air can be prevented.

The first and second surface-treatment liquids of the present invention will next be described in detail.

Examples of the isocyanate component contained in the first surface-treatment liquid include isocyanate compounds such as 2,6-tolylene diisocyanate (TDI), 4,4'-diphenyl-methane diisocyanate (MDI), p-phenylene diisocyanate (PPDI), 1,5-naphthalene diisocyanate (NDI), 3,3-dimethyl-diphenyl-4,4'-diisocyanate (TODI), and hexamethylene diisocyanate (HDI), and modified products and oligomers thereof. A prepolymer formed from a polyol and an isocyanate may also be employed.

No particular limitation is imposed on the organic solvent employed in the first surface-treatment liquid, so long as the solvent can dissolve the isocyanate component and the below-mentioned optional components (polyether polymer, acrylic fluoropolymer, and acrylic silicone polymer). Preferably, an organic solvent with which a rubber member is readily impregnated and which swells a rubber member is employed. Although the type of the solvent varies depending on the type of the rubber base of the rubber member, organic solvents such as ethyl acetate, methyl ethyl ketone (MEK), methyl isobutyl ketone (MIBK), and toluene may be used. In the case of the separated-phase treatment, the first surface-treatment liquid may be a polar aprotic solvent, which separates from a non-polar solvent (e.g., hexane). Although the type of the liquid varies depending on the type of the second surface-treatment liquid, examples of the first treatment liquid include such organic solvents such as N-methylpyrrolidone, N,N-dimethylformamide (DMF), dimethyl sulfoxide (DMSO), and acetonitrile.

The first surface-treatment liquid may further contain polyether polymer. The polyether polymer is preferably soluble in organic solvent and includes active hydrogen, which reacts with an isocyanate to form a chemical bond.

A preferred polyether polymer containing active hydrogen is, for example, epichlorohydrin rubber. The epichlorohydrin rubber used herein refers to unvulcanized epichlorohydrin rubber. Epichlorohydrin rubber is preferably used, since it can impart conductivity and elasticity to the surface-treated layer. Notably, epichlorchydrin rubber per se has active hydrogen (hydroxyl group) at one end. Epichlorohydrin rubber having in a repeating unit active hydrogen such as a hydroxyl group or an allyl group is also preferred. Examples of the epichlorohydrin rubber include epichlorohydrin homopolymer, epichlorohydrin-ethylene oxide copolymer, epichlorohydrin-ally glycidyl ether copolymer, epichlorohydrin-ethylene oxide-allyl glycidyl ether terpolymer, and derivatives thereof.

Examples of other suitable polyether polymers including active hydrogen include those having a hydroxyl group or an allyl group. Specific examples include polyols and glycols. Such polyether polymers preferably include active hydrogen at one end rather than at both ends. The polyether polymer preferably has a number average molecular weight of 300 to 1,000, from the viewpoint of imparting elasticity to the surface-treated layer formed on the surface of the rubber member. Examples of such polyether polymers include polyalkylene glycol monomethyl ether, polyalkylene glycol dimethyl ether, allylated polyether, polyalkylene glycol diol, and polyalkylene glycol triol.

Through incorporation of polyether polymer into the first surface-treatment liquid, the surface-treated layer formed therefrom has improves softness and strength. As a result, wearing of the surface of the rubber member of interest and damage of the surface of a counter photoreceptor can be prevented.

The first surface-treatment liquid may further contain a polymer selected from among an acrylic fluoropolymer and an acrylic silicone polymer.

The acrylic fluoropolymer and acrylic silicone polymer employed in the first surface-treatment liquid can be dissolved in a specific solvent and can be reacted with isocyanate to form a chemical bond. The acrylic fluoropolymer is a fluorine-containing polymer which has, for example, a hydroxyl group, an alkyl group, or a carboxyl group, and can be dissolved in a solvent. Examples include a block copolymer of an acrylic acid ester and a fluoroalkyl acrylate, and derivatives thereof. The acrylic silicone polymer is a silicone-base polymer which is soluble in a solvent. Examples include a block copolymer of an acrylic acid ester and a siloxane acrylate, and derivatives thereof.

The first surface-treatment liquid may further contain, as a conductivity-imparting material, carbon black such as Acetylene Black, Ketjen Black (product of Lion), or Toka Black (product of Tokai Carbon Co., Ltd.), or a conductivity-imparting material employed in a conventional surface-treatment liquid (see, for example, Japanese Patent Application Laid-Open (kokai) No. 2007-31703). When carbon black is employed, the amount of carbon black in the first surface-treatment liquid is preferably 0 to 40% by mass with respect to isocyanate. When the amount of carbon black is excessively large, problems such as removal of carbon black from the rubber member, deterioration of physical properties, etc. occur, which is not preferred.

The amounts of the acrylic fluoropolymer and acrylic silicone polymer employed in the first surface-treatment liquid are preferably such that the total amount of the polymers is adjusted to 2 to 30 parts by mass with respect to 100 parts by mass of isocyanate. When the total amount is less than 2 parts by mass, the surface-treated layer has poor performance to retain additives such as carbon black, whereas when the polymer amount is excessively large, the electrical resistance of a charge-imparting roller increases, thereby impairing electric discharge characteristics, and the relative isocyanate amount decreases, thereby failing to form an effective surface-treated layer, which are problematic.

No particular limitation is imposed on the second surface-treatment liquid, so long as the liquid can remove isocyanate present in the sub-surface portion of an impregnation layer of the rubber member. Preferably, the second surface-treatment liquid contains no isocyanate, or is an organic-solvent-based liquid having an isocyanate concentration much smaller than that of the first surface-treatment liquid.

Similar to the solvent employed in the first surface-treatment liquid, the organic solvent which can be employed in the second surface-treatment liquid may be a solvent which can dissolve isocyanate. However, preferred is an organic solvent which does not dissolve isocyanate or an organic solvent which hardly swells the rubber member, as compared with the organic solvent employed in the first surface-treatment liquid. When an organic solvent which dissolves isocyanate or an organic solvent which swells the rubber member, to an extent equivalent to or higher than that attained by the organic solvent employed in the first surface-treatment liquid, is employed, not only isocyanate in the top sub-surface layer but also isocyanate which is contained in the lower portion of the rubber member which isocyanate prevents staining of the roller surface are possibly removed. Use of such a solvent requires precise control of temperature and time in the operation, which is not advantageous.

The organic solvent which is suitably employed in the second surface-treatment liquid used in the aforementioned separated-phase treatment is a non-polar solvent, which is a poor solvent to isocyanate, and examples include hexane and cyclohexane. Such a solvent is advantageous, since the upper portion can be formed uniformly with a small thickness. In addition, since hexane or cyclohexane does not absorb moisture in air, there can be a suppressed effect of water on the isocyanate contained in the first surface-treatment liquid which is separated from the second surface-treatment liquid, whereby the service life of the first treatment liquid can be prolonged, which is advantageous.

On the other hand, when a surface treatment other than the separated phase treatment is performed, a polar solvent, which is a good solvent to isocyanate may be employed as a second surface-treatment liquid. Similar to the organic solvent of the first surface-treatment liquid, ethyl acetate, and methyl ethyl ketone (MEK) may be employed. When surface treatment is performed by use of such an organic solvent, the formed upper portion has a large thickness. The thicker the upper portion, the lower the hardness of the rubber member.

No particular limitation is imposed on the method of drying and curing, so long as the method can harden isocyanate in the rubber member. In one possible method, an uncured body is cooled to a temperature lower than the solidifying point of the isocyanate, followed by curing by water contained in the atmosphere. In another method, the remaining solvent is evaporated under reduced pressure, followed by curing by heat or by water. Generally, optional heat treatment is performed immediately after completion of drying at ambient temperature. The heating temperature is, for example, 40 to 150° C.

No particular limitation is imposed on the rubber member which may be formed through molding a rubber base if necessary containing a conductivity-imparting material, and vulcanizing the rubber. Examples of the rubber base include polyurethane rubber, epichlorohydrin rubber, nitrile rubber (NBR), styrene rubber (SBR), and chloroprene rubber.

The conductivity-imparting agent may be an electron-conductivity-imparting agent such as carbon black or metallic powder, an ion-conductivity-imparting agent, or a mixture thereof. Examples of the ion-conductivity-imparting agent include an organic salt, an inorganic salt, a metal complex, and an ionic liquid. Examples of the organic salt and inorganic salt include lithium perchlorate, a quaternary ammonium salt, and sodium trifluoroacetate. Examples of the metal complex include ferric halide-ethylene glycol. A more specific example is a diethylene glycol-ferric chloride complex disclosed in Japanese Patent No. 3655364. Meanwhile, ionic liquid, which is also called ambient temperature molten salt, is a molten salt which is liquid at room temperature, having a melting point of 70° C. or lower, preferably 30° C. or lower. Specific examples of ionic liquid include species disclosed in Japanese Patent Application Laid-Open (kokai) No. 2003-202722.

Figure 1B:
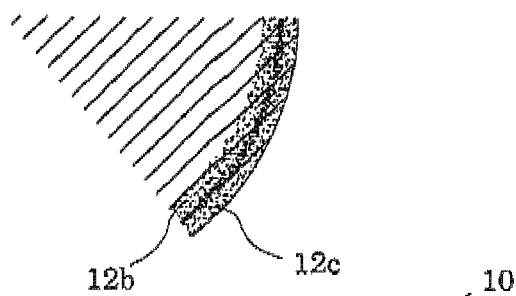

FIG. 1A is a cross-section of a rubber roller produced through the method of the present invention for performing surface treatment of a rubber member, and FIG. 1B is an enlarged cross-section of the rubber roller. As shown in FIG. 1A, a rubber roller 10 has a core shaft 11 and an elastic layer (rubber member) 12, which is formed through molding a rubber base containing a conductivity-imparting material and other appropriate additives and heat-curing the rubber composition. The top layer of the elastic layer 12 is a surface-treated layer 12a. As used herein, the term "isocyanate component" collectively refers to isocyanate compounds, including polymers of an isocyanate compound, and may be denoted by simply "isocyanate." The surface-treated layer 12a is formed of an upper portion 12c on the uppermost layer side and a lower portion 12b beneath the upper portion. In the upper portion 12c, the density of impregnated isocyanate is greater on the inner side than on the surface side within the upper portion. For example, in the upper portion 12c, the density of the isocyanate component gradually increases inward from the top surface. In the lower portion 12b, the density of the isocyanate component gradually decreases inwardly from the top surface. When the presence of the upper portion 12c is referred to, it means that there is a region(s) where density of the isocyanate component is greater on the inner side than on the surface side within the upper portion. In other words, there is a region(s) where density of the isocyanate component decreases toward the top surface. Thus, absence of isocyanate is permitted at least at the top surface portion of the upper portion 12c. The interface between the upper portion 12c and the lower portion 12b is not necessarily clear, so long as the upper portion 12c provides a hardness which is lower at the proximity of the top surface. The upper portion 12c is provided so as to realize a low hardness (i.e., lower than that of the lower portion 12b) at the outermost layer and, thus, has a thickness of 1 μm or more, preferably 10 μm or more. The upper portion 12c is particularly preferably provided at least to a depth such that the portion satisfactorily deforms during use. That is, the thickness of the upper portion is preferably about 10 to about 100 μm. The lower portion 12b preferably has a thickness of about 100 to about 1,000 μm. The thickness of the upper portion 12c or the lower portion 12b may be predicted through, for example, measuring the rubber hardness or electrical resistance of a site of the surface of the conductive rubber member, the surface being exposed by polishing. In the above-described case, an excessive isocyanate component deposited on the surface of the rubber roller is washed, and isocyanate present in the first impregnation layer is partially removed through the treatment with the second surface-treatment liquid. However, the surface treatment is not limited to the above procedure. For example, when only an excessive isocyanate component deposited on the surface of the rubber roller is removed with the second surface-treatment liquid, the upper portion 12c is not formed. In this case, the rubber roller has the surface-treated layer 12a formed only of the lower portion 12b.

In the rubber roller 10 produced through the method of the present invention for performing surface treatment of a rubber member, the surface-treated layer 12a forming a surface portion of elastic layer 12 is formed of an upper portion 12c and an lower portion 12b, the two portions integrally forming the surface portion of the elastic layer 12. The lower portion 12b of the surface-treated layer 12a is produced mainly through curing an isocyanate component to form the surface treated layer. In the lower portion 12b, the density of the isocyanate component gradually decreases inwardly, whereby bleeding of contaminants such as a plasticizer to a surface of the rubber roller can be prevented. Thus, the rubber roller has an excellent anti-staining property to a photoreceptor.

The above-described case is surface treatment of the rubber roller 10 having a single elastic layer 12. However, the present invention is not limited to this case. For example, the rubber member may have two or more elastic layers, which may be a sponge layer or a solid layer and have a shape of blade, brush, belt, film, sheet, or chip.

In an alternative surface treatment procedure, after surface treatment with the second surface-treatment liquid, the rubber member is impregnated with a third surface-treatment liquid for forming a second impregnation layer, and the treated surface of the rubber member is sequentially treated, without exposure to air, with a second surface-treatment liquid, to thereby produce another rubber member. Through treatment with the third surface-treatment liquid, the rubber member can be imparted with additional performance, or have more suitable resilience in response to deformation or lower hardness. No particular limitation is imposed on the third surface-treatment liquid, so long as the liquid can form a second impregnation layer. The third surface-treatment liquid is appropriately selected so as to satisfy surface treatment conditions.

The second impregnation layer is preferably formed in a shallow portion of the aforementioned first impregnation layer, for example, in a portion where isocyanate has been partially removed. However, the second impregnation layer may be overlapped with the first impregnation layer, or may be formed to a depth deeper than the surface of the first impregnation layer.

Figure 1C:
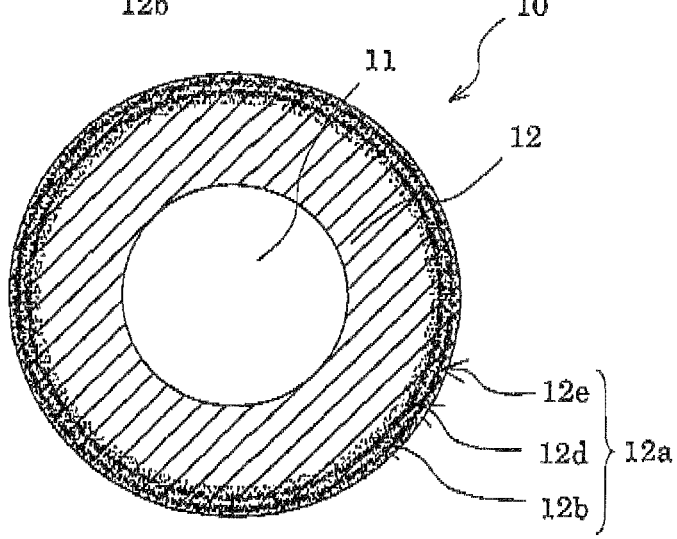
Figure 1D:
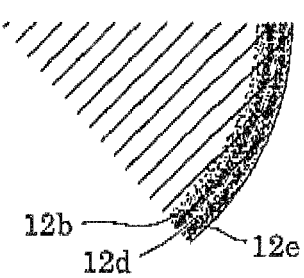

FIGS. 1C, 1D are cross-sections of a rubber roller produced through curing a second impregnation layer which has been formed in a shallow portion of the first impregnation layer. As shown in FIGS. 1C, 1D, the second impregnation layer is formed and cured in a shallow portion of the first impregnation layer by use of a third surface-treatment liquid containing an isocyanate component. Through provision of the second impregnation layer in a shallow potion of the first impregnation layer, a lower portion 12d in which the density the isocyanate component gradually decreases inwardly, and an upper portion 12e having a density of the isocyanate component greater on the inner side than the surface side within the upper portion are formed. That is, in the rubber member, the surface-treated layer 12a is formed of the lower portion 12b, the lower portion 12d, and the upper portion 12e. In the above-described case, an excessive isocyanate component deposited on the surface of the rubber roller is washed, and isocyanate present in the first impregnation layer is partially removed through the second treatment with the second surface-treatment liquid. However, the surface treatment is not limited to the above procedure. For example, when only an excessive isocyanate component deposited on the surface of the rubber roller is removed through the second treatment with the second surface-treatment liquid, the upper portion 12e is not formed. In this case, the rubber roller has the surface-treated layer 12a formed of the lower portions 12b, 12d.

The third surface-treatment liquid may be, for example, the same liquid as the first surface-treatment liquid. Specifically, after treatment of the roller surface with the second surface-treatment liquid, the treated surface is impregnated with the first surface-treatment liquid, to thereby form a second impregnation layer. The surface of the rubber member is sequentially treated, without exposure to air, with the second surface-treatment liquid, to thereby form a double-surface treated rubber member.

Needless to say, the third surface-treatment liquid is different from the first surface-treatment liquid. The third surface-treatment liquid may be, for example, a surface-treatment liquid containing an isocyanate component. The third surface-treatment liquid may further contain at least one species selected from the group consisting of a polyether-based polymer, an acrylic fluoropolymer, an acrylic silicone polymer, and a conductivity-imparting material.

No particular limitation is imposed on the isocyanate component employed in the third surface-treatment liquid. The third surface-treatment liquid may be identical to or different from the isocyanate component employed in the first surface-treatment liquid. When the same isocyanate component as employed in the first surface-treatment liquid is used, the third surface-treatment liquid preferably has a lower isocyanate component concentration than that of the first surface-treatment liquid, since the density of the isocyanate component of the surface portion of the rubber member decreases, thereby readily ensuring softness of the surface.

As described above, through appropriate selection of the third surface-treatment liquid, a rubber member of interest can be produced. For example, when an isocyanate component (e.g., MDI) exhibiting excellent anti-staining effect is employed as a first surface-treatment liquid, and an isocyanate component (e.g., prepolymer) imparting softness to rubber is employed as a third surface-treatment liquid, a rubber member exhibiting excellent anti-staining property and softness can be produced. When a first surface-treatment liquid containing no carbon black and a third surface-treatment liquid containing carbon black are employed, a rubber member containing carbon black in a surface portion, particularly in a shallow surface portion, thereby exhibiting excellent conductivity can be produced. When an isocyanate component (e.g., MDI) exhibiting excellent anti-staining effect is employed as a first surface-treatment liquid, and an isocyanate component and an acrylic fluoropolymer, an acrylic silicone polymer, or a polyether-based polymer, as a third surface-treatment liquid, a rubber member which effectively prevents deposition of a toner component or the like and which exhibits excellent softness particularly in a surface portion can be produced.

Alternatively, the third surface-treatment liquid contains, instead of an isocyanate component, at least one polymer species selected from the group consisting of a polyether-based polymer, an acrylic fluoropolymer, and an acrylic silicone polymer, and an organic solvent. Through employment of such a third surface-treatment liquid, a rubber member having improved softness and strength can be produced.

No particular limitation is imposed on the organic solvent employed in the aforementioned third surface-treatment liquid, and an appropriate solvent is selected so as to satisfy treatment conditions. The same solvents as described in relation to the first surface-treatment liquid may be employed.

After surface treatment with the second surface-treatment liquid, the surface of the rubber member may be further treated with a fourth surface-treatment liquid for partially removing isocyanate present in the impregnation layer. The fourth surface-treatment liquid is formed of an organic solvent. No particular limitation is imposed on the fourth surface-treatment liquid, and the fourth liquid is preferably has a higher isocyanate solubility, as compared with the second surface-treatment liquid. In the case of phase-separated treatment, the same solvents as described in relation to the first surface-treatment liquid may be employed as the fourth surface-treatment liquid (organic solvent). Preferably, a solvent having a low isocyanate component solubility, as compared with the first surface-treatment liquid, and/or an organic solvent which dose not swell the rubber member is employed. When a surface treatment other than phase-separated treatment is performed, the same solvents as described in relation to the second surface-treatment liquid may be employed.

According to the method of the present invention for performing surface treatment of a rubber member, there can be provided a rubber member which has a low hardness in response to deformation and which does not cause staining of an OPC and other members and leakage.

The rubber member produced through the method of the present invention for performing surface treatment of a rubber member is suitable for, for example, a charge-imparting roller, a development roller, a cleaning roller, a toner-supply roller, a toner-regulating roller, an image-transfer roller, an intermediate image-transfer roller, a cleaning blade, a transfer belt, etc., for use in an image-forming apparatus such as an electrophotographic or toner-jet-type copying machine or printer.

The surface treatment apparatus of the present invention for a rubber member is adapted for use where a rubber member is immersed in a first surface-treatment liquid containing an isocyanate component and an organic solvent and subsequently a surface of the rubber member is treated while the rubber member is transferred from the first surface-treatment liquid to a second surface-treatment liquid, the use of the two liquids forming separate phases.

Embodiments of the surface treatment apparatus of the present invention for a rubber member will next be described in detail. However, the embodiments described hereinbelow are given only for the illustration purpose and are not construed as limiting the invention thereto.

Embodiment 1

Figure 2:
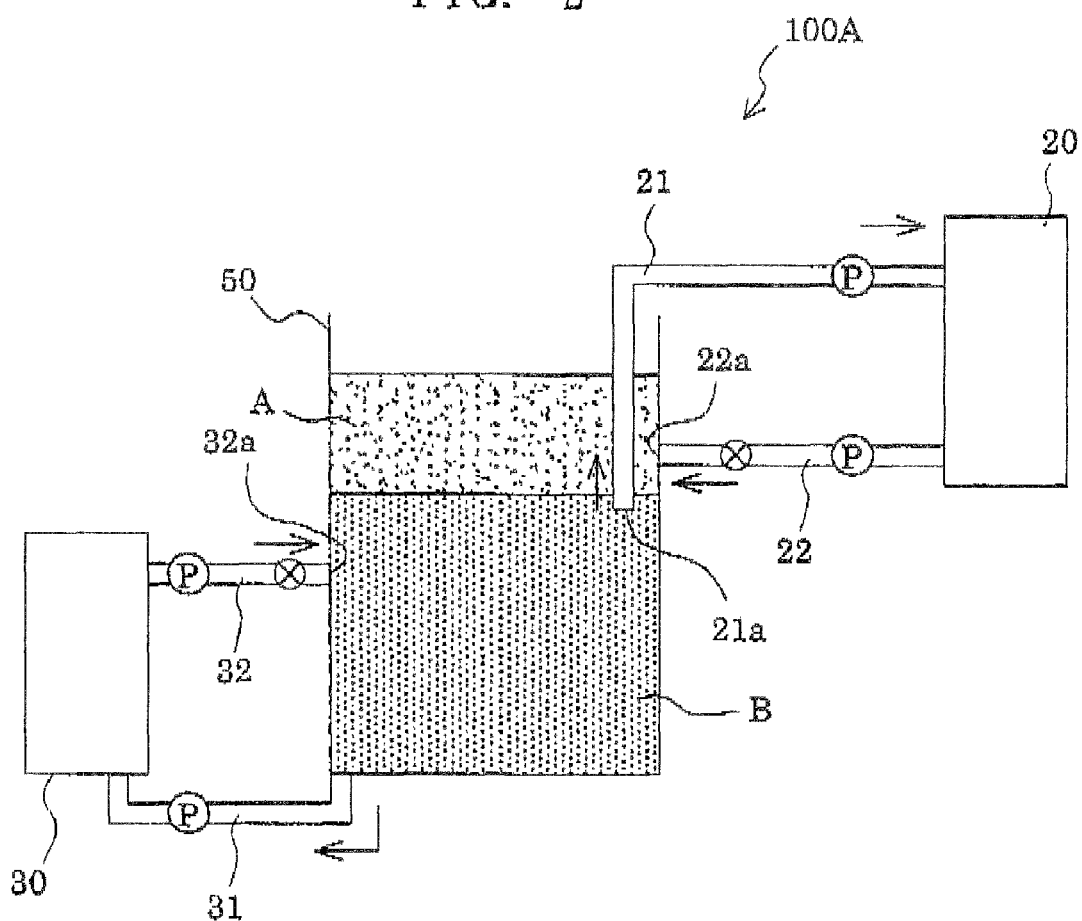
FIG. 2 is a cross-section of surface treatment apparatus for a rubber member according to Embodiment 1 of the invention.

FIG. 2 is a cross-sectional view of surface treatment apparatus for a rubber member of Embodiment 1.

A container 50 of the surface treatment apparatus for a rubber member has a shape of, for example, a hollow cylinder or a hollow polygonal prism and, during use, receives a first surface-treatment liquid containing an isocyanate component and an organic solvent, and a second surface-treatment liquid which is separated from the first liquid, in a phase-separated two-layer state.

The container 50 is equipped with a discharge tube 21 for discharging a surface-treatment liquid forming an upper liquid layer A, and an outlet 21a of the discharge tube 21 is disposed below the interface between the upper liquid layer A and a lower liquid layer B. The discharge tube 21 is formed of a plurality of cylindrical pipes so that the discharge tube 21 can stretch and contract so as to dispose the outlet 21a below the liquid surface of the liquid layer B fed to the container 50.

The discharge tube 21 is connected to a pump for discharging the surface-treatment liquid for forming the upper liquid layer A, and is connected to a tank 20, provided outside the container 50, by the mediation of the pump. The tank 20 is connected to the container so by the mediation of an introduction path 22. An inlet 22a of the introduction path 22 is disposed above the outlet 21a disposed through a sidewall of the container 50, so that the surface-treatment liquid for forming the upper liquid layer A stored in the tank 20 and a small amount of the surface-treatment liquid for forming the lower liquid layer B are introduced into the container 50. The introduction path 22 is equipped with an openable-closable valve and a pump for feeding the surface-treatment liquid for forming the upper liquid layer A and a small amount of the surface-treatment liquid for forming the lower liquid layer B.

At the bottom wall of the container 50, a discharge path 31 is provided for discharging the surface-treatment liquid for forming the lower liquid layer B. The discharge path 31 is connected to a tank 30 disposed outside the container 50. The tank 30 is connected to the container 50 by the mediation of an introduction path 32. An inlet 32a of the introduction path 32 is disposed below the outlet 21a disposed through a sidewall of the container 50, so that the surface-treatment liquid for forming the upper liquid layer B stored in the tank 30 is introduced into the container 50. The introduction path 32 is equipped with an openable-closable valve and a pump for feeding the surface-treatment liquid for forming the upper liquid layer A and a small amount of the surface-treatment liquid for forming the lower liquid layer B.

In Embodiment 1, the discharge tube 21 is stretchable/contractable. However, the discharge tube 21 may be non-stretchable. In this case, the outlet 21a is disposed below the liquid surface of the surface-treatment liquid for forming the lower liquid layer B, upon introduction of the surface-treatment liquid for forming the upper liquid layer A and the surface-treatment liquid for forming the lower liquid layer B into the container.

In Embodiment 1, the surface-treatment liquid for forming the upper liquid layer A is discharged through the discharge tube 21 by means of the pump. However, the means for discharging the surface-treatment liquid for forming the upper liquid layer A is not limited thereto. For example, an outlet of the discharge path is formed in the sidewall of the container 50 such that the outlet is disposed below the interface between the upper liquid layer A and the lower liquid layer B. The surface-treatment liquid forming the upper liquid layer A may be discharged through the discharge path by means of the self weight of the liquid.

No particular limitation is imposed on the positions of the inlet 22a of the introduction path 22 and the inlet 32a of the introduction path 32. In Embodiment 1, openings of the introduction path 22 and the introduction path 32 are disposed in the sidewall of the container 50. However, the introduction path 22 and the introduction path 32 may be inserted into the container 50.

Although, in Embodiment 1, the tank 20, introduction path 22, discharge path 31, tank 30, and introduction path 32 are provided, provision of these members is optional.

Figure 3A:
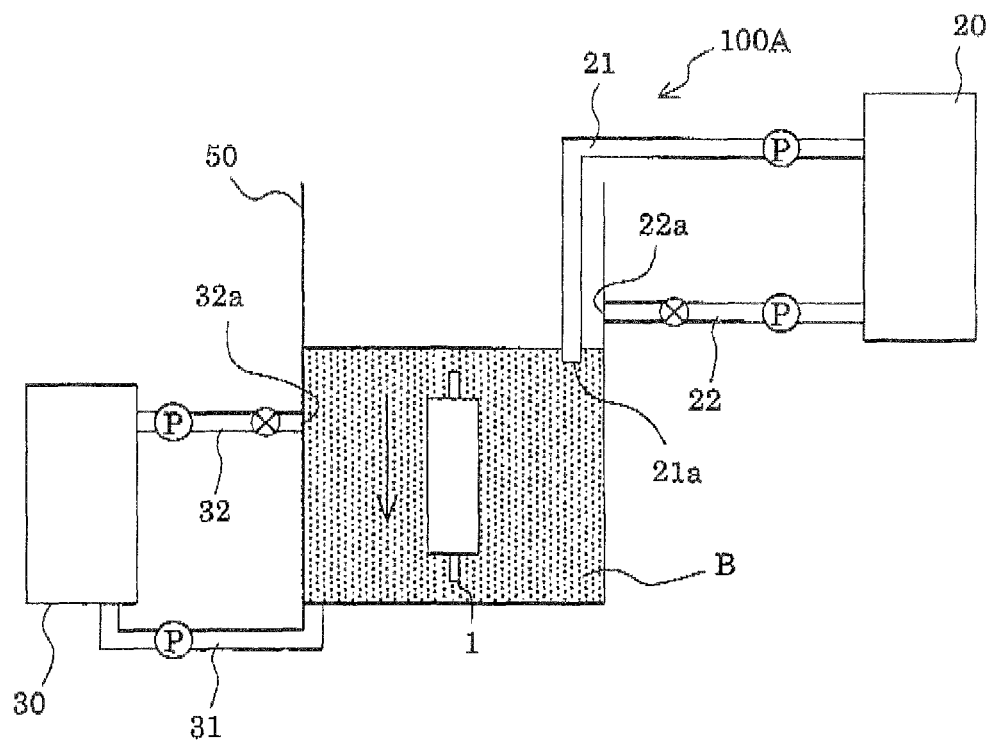
FIGS. 3A to 5B are schematic views showing a method and apparatus of the present invention for performing surface treatment of a rubber member.
Figure 3B:
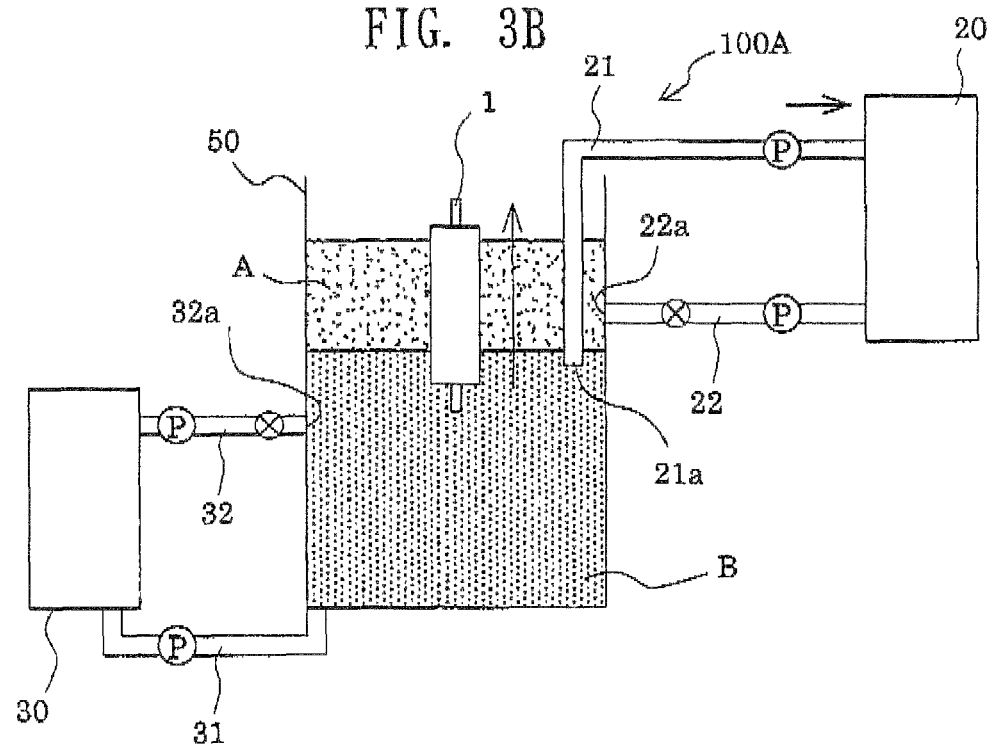

With reference to FIGS. 3A, 3B, the method for performing surface treatment of a rubber member by means of surface treatment apparatus 100A for a rubber member having the aforementioned structure will next be described. FIGS. 3A, 3B are schematic views showing a method and apparatus of the present invention for performing surface treatment of a rubber member. In Embodiment 1, the upper liquid layer A is formed of a second surface-treatment liquid, and the lower liquid layer B is formed of a first surface-treatment liquid.

Firstly, the first surface-treatment liquid for forming the lower liquid layer B is supplied via a feed path (not illustrated) to the container 50 such that the level of the liquid surface of the lower liquid layer B is adjusted to be higher than the level of the outlet 21*a* of the discharge tube 21. The level of the liquid surface of the lower liquid layer B is adjusted so as to ensure sufficient immersion of a rubber member. When the liquid surface of the lower liquid layer B is higher than the level of interest, the first surface-treatment liquid is discharged through the discharge path 31, to thereby adjust the level of the liquid layer B.

As shown in FIG. 3A, a rubber member 1 is immersed in the lower liquid layer B (first surface-treatment liquid), whereby the rubber member 1 is impregnated with the first surface-treatment liquid.

Subsequently, a second surface-treatment liquid (upper liquid layer A), which is separated from the first surface-treatment liquid, is supplied through a feed path (not illustrated) to the lower liquid layer B in which the rubber member 1 is immersed and which is placed in the container 50 until the level of the upper liquid layer A reaches a predetermined level. As a result, the first surface-treatment liquid and the second surface-treatment liquid are placed in the container 50 to form two layers.

As shown in FIG. 3B, the rubber member 1 is slowly drawn up from the lower liquid layer B (first surface-treatment liquid) to the upper liquid layer A (second surface-treatment liquid). Through this procedure, an isocyanate component contained in a surface portion of the rubber member 1 is partially removed. The thus-treated rubber member is thermally cured or subjected to a similar treatment, whereby the aforementioned rubber member is produced.

When surface treatment of a new rubber member is performed, the second surface-treatment liquid and a small amount of the first surface-treatment liquid are discharged from the container 50 by means of a pump attached to the discharge tube 21.

In the case where the amount of the first surface-treatment liquid has decreased, the first surface-treatment liquid stored in the tank 30 is supplied by means of a pump through the introduction path 32, or the first surface-treatment liquid is supplied through a feed path (not illustrated), to thereby replenish the first surface-treatment liquid (lower liquid layer B) in the container 50.

After completion of immersion of the rubber member in the lower liquid layer B, the second surface-treatment liquid and a small amount of the first surface-treatment liquid, which are stored in the tank 20, are supplied through the introduction path 22 to the container 50. As a result, two layers are formed from the second surface-treatment liquid and the first surface-treatment liquid. Thereafter, in a similar manner, the rubber member is slowly drawn up from the lower liquid layer B (first surface-treatment liquid) to the upper liquid layer A (second surface-treatment liquid).

Next will be described a method for performing surface treatment of a rubber member by means of surface treatment apparatus 100A for a rubber member, when the first surface-treatment liquid forms an upper liquid layer A, and the second surface-treatment liquid forms a lower liquid layer B. FIGS. 4A to 5B are schematic views showing a method and apparatus of the present invention for performing surface treatment of a rubber member.

Figure 4A:
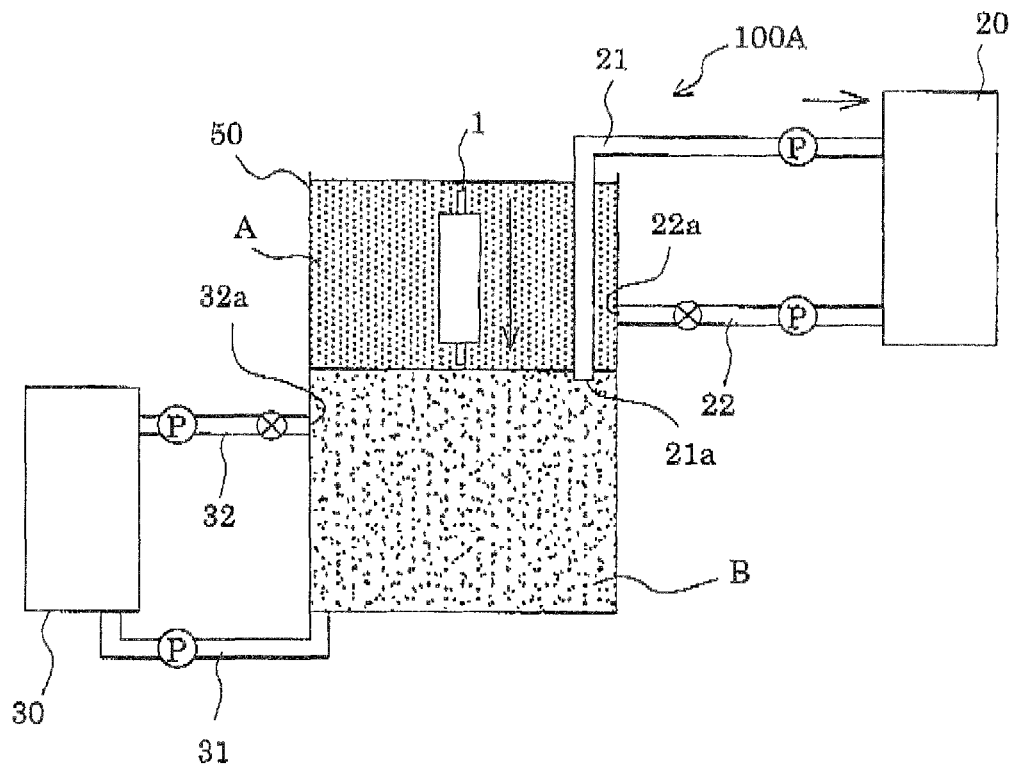

Firstly, a second surface-treatment liquid (lower liquid layer B) is supplied through a feed path (not illustrated) to a container 50, and then, a first surface-treatment liquid (upper liquid layer A) is supplied thereto through a feed path (not illustrated), to thereby form two layers. As shown in FIG. 4A, a rubber member is immersed in the upper liquid layer A.

Figure 4B:
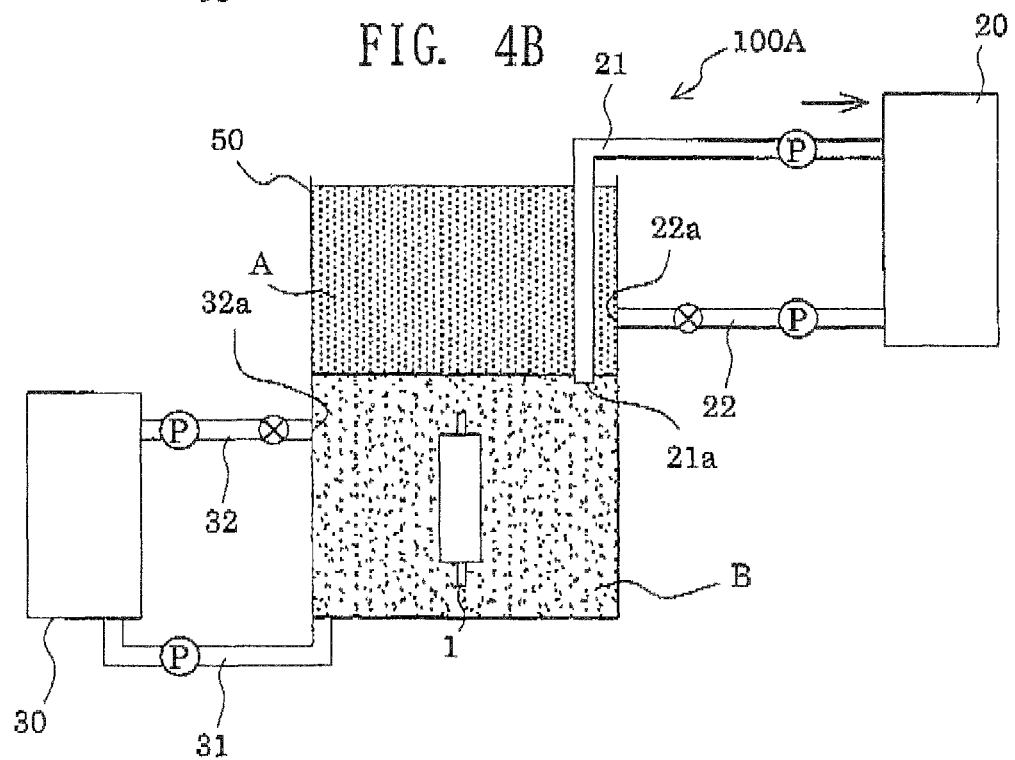

As shown in FIG. 4B, a rubber member 1 is transferred from the upper liquid layer A to the lower liquid layer B.

Figure 5A:
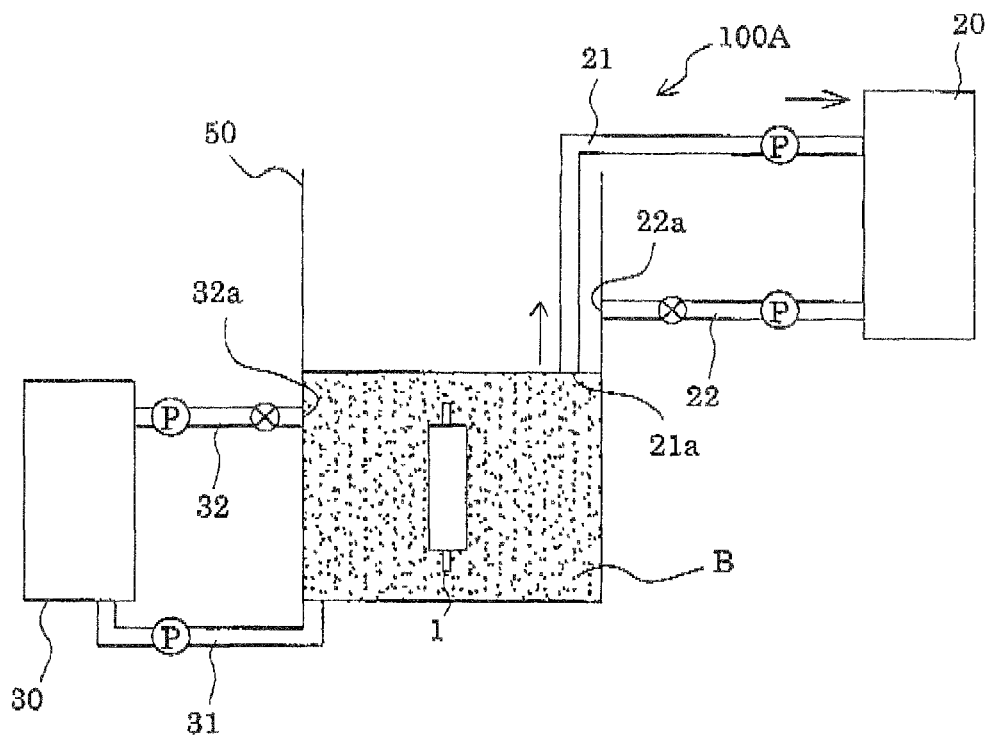
Figure 5B:
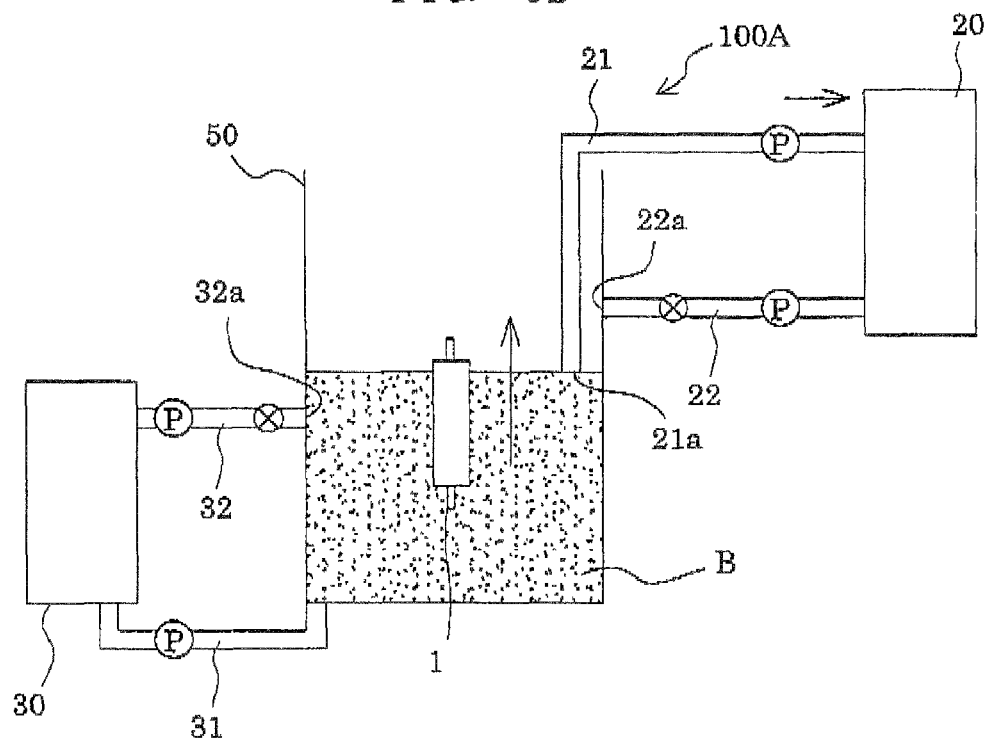

Subsequently, as shown in FIG. 5A, the first surface-treatment liquid and a small amount of the second surface-treatment liquid are discharged from the container 50 by means of a pump attached to a discharge tube 21 and stored in a tank 20. Finally, as shown in FIG. 5B, the rubber member 1 is drawn up from the lower liquid layer B.

When surface treatment of a new rubber member is performed, the first surface-treatment liquid and a small amount of the second surface-treatment liquid stored in the tank 20 are supplied to the container 50 by means of a pump attached to the introduction path 22.

As described above, the surface treatment apparatus for a rubber member of Embodiment 1 can reuse the first surface-treatment liquid and the second surface-treatment liquid. Thus, the apparatus realizes low-cost production of rubber members and prevents environmental pollution.

Embodiment 2

Figure 6:
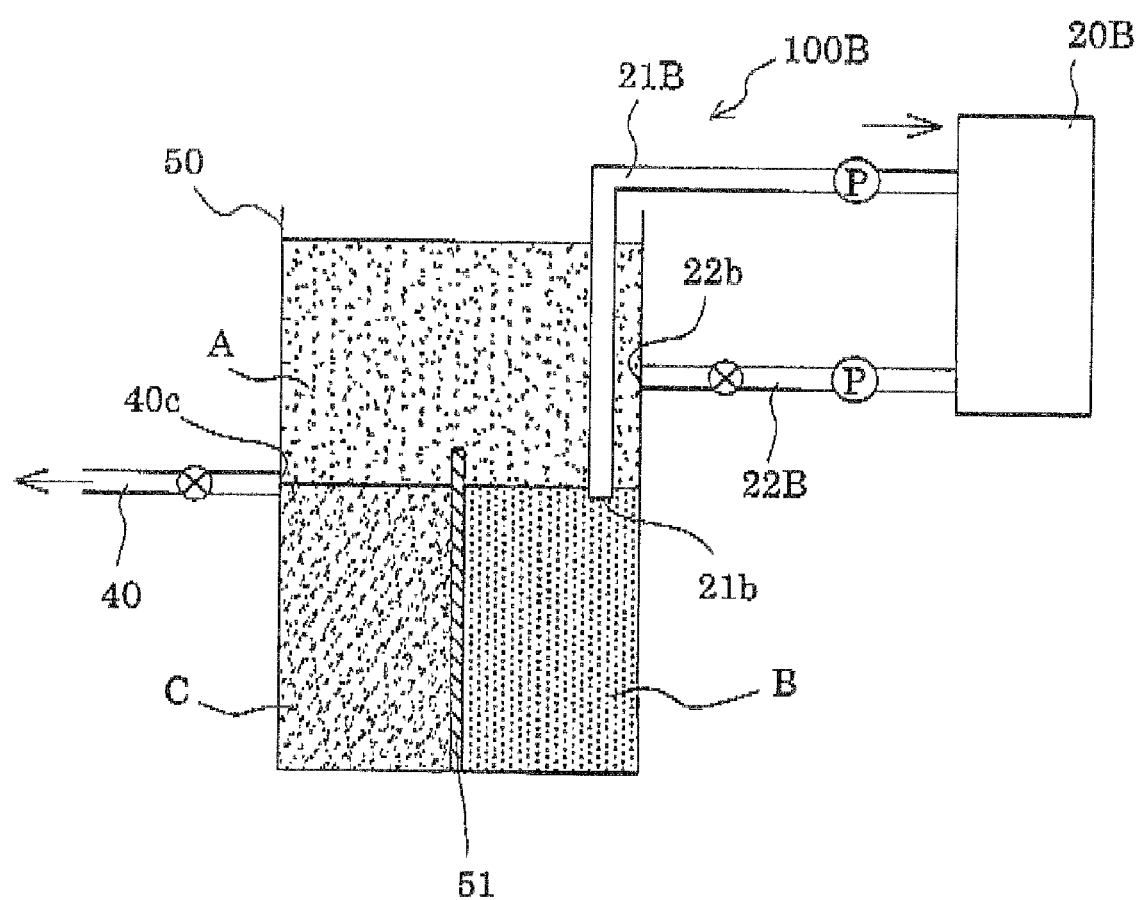
FIG. 6 is a cross-section of surface treatment apparatus for a rubber member according to Embodiment 2 of the invention.

FIG. 6 is a cross-sectional view of surface treatment apparatus for a rubber member according to Embodiment 2 of the invention. The same reference numerals as employed in Embodiment 1 are denoted by the same reference numerals, and repeated descriptions are omitted.

A container 50, which serves as a main body of surface treatment apparatus for a rubber member, has a separator plate 51 extending upward from the bottom of the container 50 to a certain height which is lower than the height of the container, which allows two liquid layers to be received in a lower section of the container. The separator plate 51 is provided for dividing the lower section of the container 50. No particular limitation is imposed on the separator plate, so long as the plate can regulate transfer of the liquids. The container 50 can receive the lower liquid layer B and a lower liquid layer C in a separated state and the upper liquid layer A in an upper section. The interface between the upper liquid layer A and the lower liquid layer B, and the interface between the upper liquid layer A and the lower liquid layer C are disposed below the top end of the separator plate 51.

The container 50 is equipped with a discharge tube 21B for discharging a surface-treatment liquid forming the upper liquid layer A. An outlet 21*b* of the discharge tube 21B is disposed below the upper end of the separator plate 51 and below the interface between the upper liquid layer A and the lower liquid layer B.

The discharge tube 21B is connected to a pump for discharging the surface-treatment liquid for forming the upper liquid layer A, and is connected to a tank 20B, provided outside the container 50, by the mediation of the pump. The tank 20B is connected to the container 50 by the mediation of an introduction path 22B. An inlet 22*b* of the introduction path 22B is disposed above an outlet 21*b* disposed through a sidewall of the container 50, so that the surface-treatment liquid for forming the upper liquid layer A stored in the tank 20B and a small amount of the surface-treatment liquid for forming the lower liquid layer B are introduced into the container 50. The introduction path 22B is equipped with an openable-closable valve and a pump for feeding the surface-treatment liquid for forming the upper liquid layer A and the surface-treatment liquid for forming the lower liquid layer C.

A discharge path 40 equipped with an openable/closable valve is provided through a sidewall section the lower section of the container 50, the sidewall section being in contact with the liquid layer C during use. An outlet 40C of the discharge path 40 is disposed at approximately the same level as that of the outlet 21*b*, so as to discharge any surface-treatment liquid present near the interface between the upper liquid layer A and the lower liquid layer C.

With reference to FIGS. 7A to 8E, the method for performing surface treatment of a rubber member by means of surface treatment apparatus 100B for a rubber member having the aforementioned structure will next be described. FIGS. 7A to 8B are schematic views showing a method and apparatus of the present invention for performing surface treatment of a rubber member. In Embodiment 2, the upper liquid layer A is formed of a second surface-treatment liquid, the lower liquid layer B is formed of a first surface-treatment liquid, and the lower liquid layer C is formed of a third surface-treatment liquid.

Firstly, the first surface-treatment liquid for forming the lower liquid layer B is supplied via a feed path (not illustrated) to the container 50 such that the level of the liquid surface of the lower liquid layer B is adjusted to be higher than the level of the outlet 21*b* of the discharge tube 21B and lower than the level of the separator plate 51. The level of the liquid surface of the lower liquid layer B is adjusted so as to ensure sufficient immersion of a rubber member. The third surface-treatment liquid for forming the lower liquid layer C is supplied to the container, and the lower liquid layer C is formed in a similar manner. The level of the liquid surface of the lower liquid layer C is adjusted so as to ensure sufficient immersion of a rubber member. Note that the surface level of the lower liquid layer B and that of the lower liquid layer C are not necessarily the same, but the levels are preferably nearly equivalent.

Figure 7A:
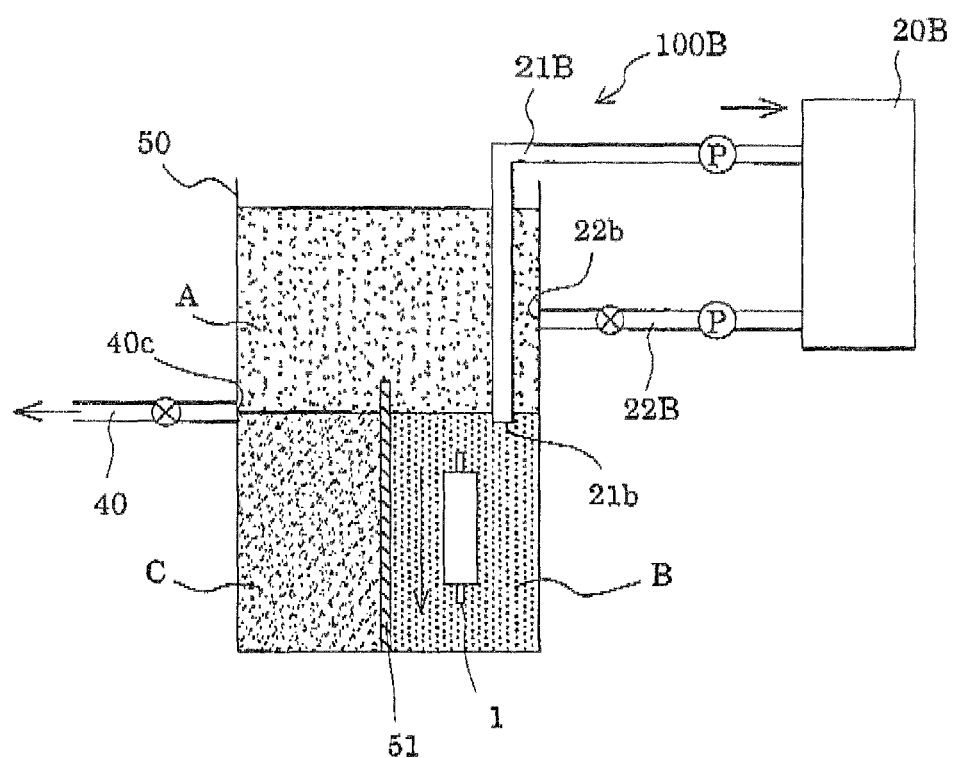
FIGS. 7A to 8B are schematic views showing a method and apparatus of the present invention for performing surface treatment of a rubber member.

As shown in FIG. 7A, a rubber member 1 is immersed in the lower liquid layer B (first surface-treatment liquid), whereby the rubber member 1 is impregnated with the first surface-treatment liquid.

Subsequently, a second surface-treatment liquid, which is separated from the first surface-treatment liquid, is supplied through a feed path (not illustrated) to the lower liquid layer B in which the rubber member 1 is immersed and which is placed in the container 50 until the level of the upper liquid layer A reaches a predetermined level. As a result, the first surface-treatment liquid and the second surface-treatment liquid are placed in the container 50 to form separated two layers, and the third surface-treatment liquid and the second surface-treatment liquid are similarly placed to form separated two layers. The level of the liquid surface of the lower liquid layer A is adjusted so as to ensure sufficient immersion of a rubber member.

Figure 7B:
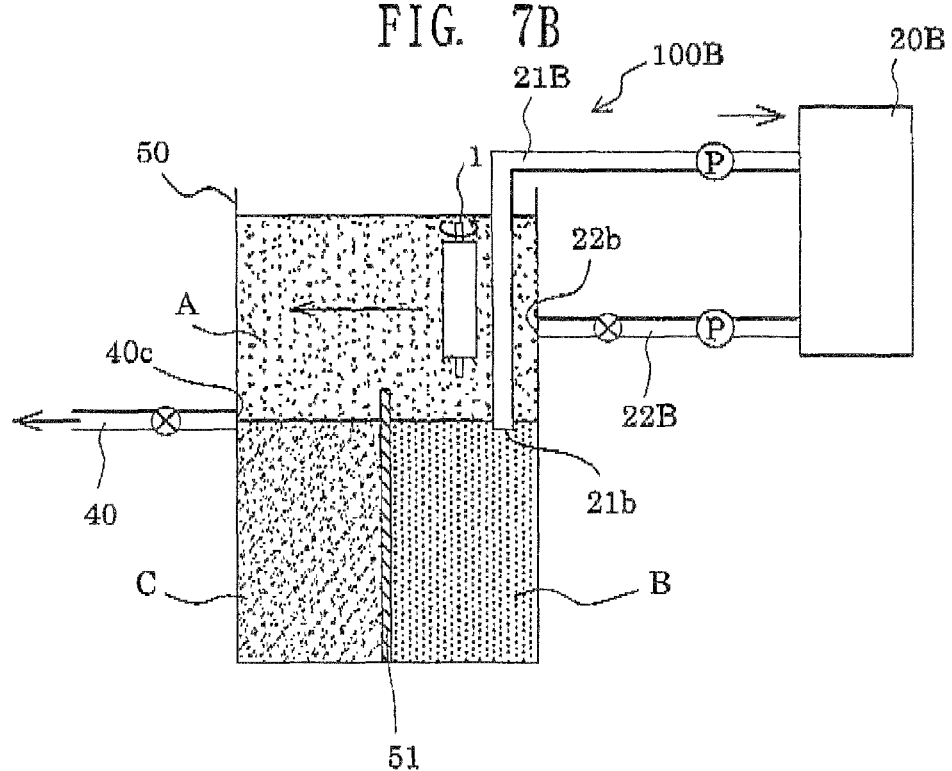

As shown in FIG. 7B, the rubber member 1 is slowly drawn up from the lower liquid layer B (first surface-treatment liquid) to the upper liquid layer A (second surface-treatment liquid). When the level of the rubber member 1 is higher than the interface between the lower liquid layer B and the upper liquid layer A, the rubber member 1 is moved to a portion of liquid A above the lower liquid layer C, with being rotated along the axis.

Figure 8A:
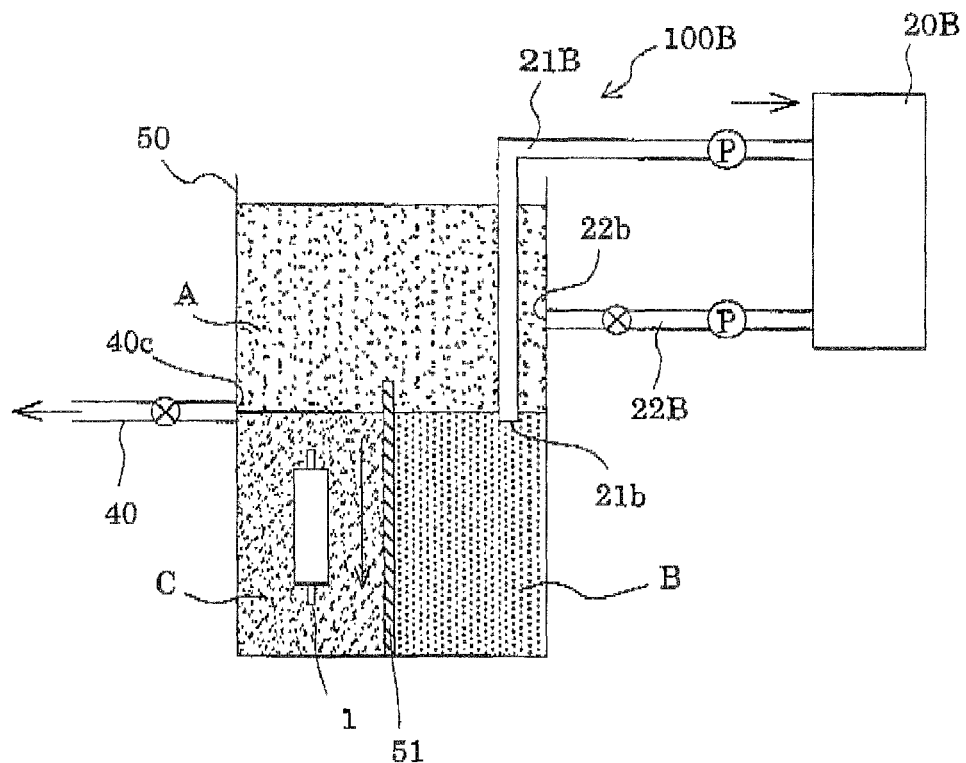

As shown in FIG. 8A, the rubber member 1 is immersed in the lower layer C. When the first surface-treatment liquid eluted from the rubber member 1 is present near the interface between the upper liquid layer A and the lower liquid layer C, at least the first surface-treatment liquid is discharged through the outlet 40*c*.

Figure 8B:
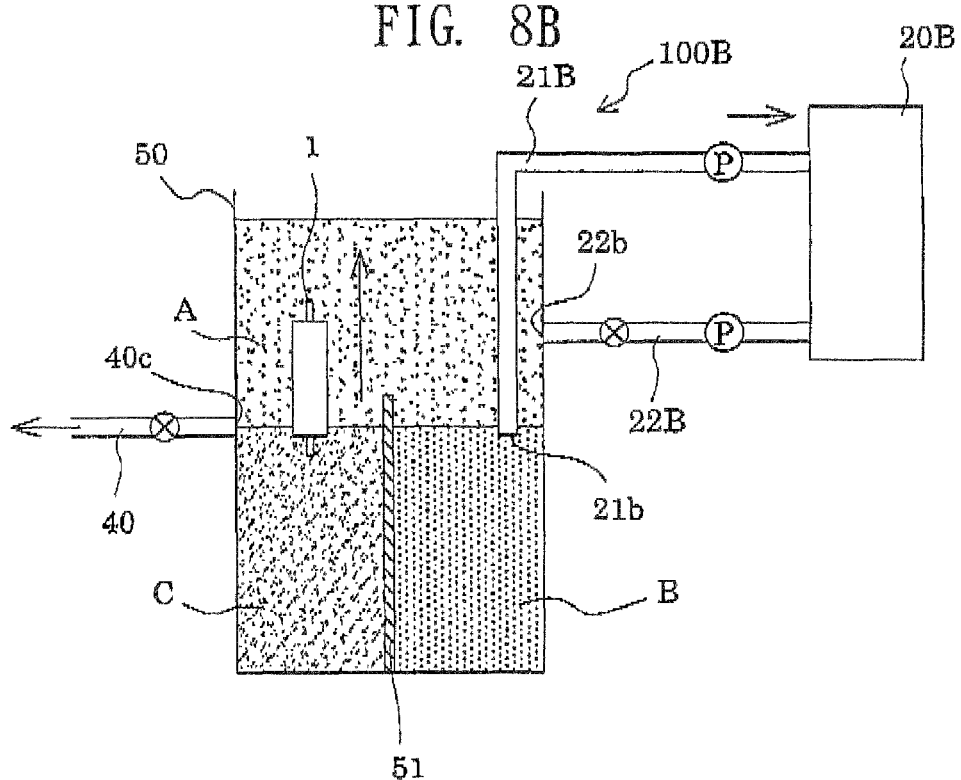

Finally, as shown in FIG. 8B, the rubber member 1 is slowly drawn up through the upper liquid layer A. The thus-treated rubber member is thermally cured or subjected to a similar treatment, whereby the aforementioned rubber member is produced.

When surface treatment of a new rubber member is performed, the second surface-treatment liquid and a small amount of the first surface-treatment liquid are discharged from the container 50 by means of a pump attached to the discharge tube 21B. In this case, the second surface-treatment liquid (a portion of the upper liquid layer A) may remain in the lower liquid layer C in the container 50.

In the case where the amount of the first surface-treatment liquid has decreased, the first surface-treatment liquid is supplied through a feed path (not illustrated), to thereby replenish the first surface-treatment liquid (lower liquid layer B) in the container 50. In the case where the amount of the third surface-treatment liquid has decreased, the third surface-treatment liquid is supplied through a feed path (not illustrated), to thereby replenish the third surface-treatment liquid (lower liquid layer C) in the container 50. The levels of the lower liquid layer B and the lower liquid layer C are adjusted to be lower than the upper end of the separator plate 51.

After completion of immersion of the rubber member in the lower liquid layer B, the second surface-treatment liquid and a small amount of the first surface-treatment liquid, which are stored in the tank 20B, are supplied through the introduction path 22B to the container 50. Thereafter, the aforementioned procedure is carried out.

As described above, the surface treatment apparatus for a rubber member of Embodiment 2 can reuse the first, second and third surface-treatment liquids. Thus, the apparatus realizes low-cost production of rubber members and prevents environmental pollution.

In Embodiment 2, the outlet 21*b* of the discharge tube 21B is disposed to be lower than the top end of the separator plate 51 and lower than the interface between the upper liquid layer A and the lower liquid layer B. In addition, a discharge tube may be further provided on the lower liquid layer C side of the container so that the surface-treatment liquid forming the upper liquid layer A and the third surface-treatment liquid forming the lower liquid layer C are discharged therethrough. When a discharge tube is provided on the lower liquid layer C side of the container, the outlet of the discharge tube is disposed to be lower than the top end of the separator plate 51 and lower than the interface between the upper liquid layer A and the lower liquid layer C.

Yet alternatively, the separator plate 51 provided in the container 50 may extend from the bottom to the upper section such that the upper liquid layer A is received in a separated state. In this case, when the rubber member 1 is drawn up from the second surface-treatment liquid, the atmosphere of the container 50 is purged with dry air or an inert gas (e.g., nitrogen or argon) in order to prevent contact with water contained in air. Before the rubber member 1 is immersed in the third surface-treatment liquid, there must be confirmed absence of a partially dried area of the surface of the rubber member 1, or any uniformly dried surface state. If the rubber member 1 is in a incompletely-dried state, treatment through immersion in the third surface-treatment liquid cannot be performed uniformly due to such a non-uniform dried state.

Through employment of the above-mentioned surface treatment apparatus for a rubber member, there can be provided a rubber member which has low hardness in response to deformation and which does not cause staining of an OPC and other members and leakage.

EXAMPLES

The present invention will next be described in detail by way of examples, which should not be construed as limiting the invention thereto. Unless otherwise specified, the unit "part(s)" employed in the Examples and Comparative Examples refers to "part(s) by mass."

Example 1

<Production of Roller>

Ketjen Black EC (product of Ketjen Black International) (3 parts) and Asahi #60 (product of Asahi Carbon) (5 parts) were added to 3-functional polyether polyol (MN-3050, product of Mitsui Takeda Chemical) (100 parts), and carbon particles were dispersed to a particle size of about 20 μm or less, followed by maintaining at 80° C., and defoaming and dehydrating for 6 hours under reduced pressure, to thereby prepare liquid A. Separately, Coronate C-HX (product of Nippon Polyurethane industry Co., Ltd.) (10 parts) was added to a prepolymer (Adiprene L100, product of Uniroyal) (22 parts), and the mixture was maintained at 80° C., to thereby prepare liquid B. Liquids A and B were mixed, and the mixture was poured into a metal mold (iron pipe, φ: 23 mm) in which a shaft (φ: 8 mm, l: 270 mm) had been inserted along the center axis and which had been heated at 120° C. The mixture was molded at 120° C. for 120 minutes, to thereby produce a roller having a conductive polyurethane layer on a shaft surface (except both ends of the shaft). The surface of the roller was polished by 1.5 mm, to thereby prepare a roller (before surface treatment) having an outer diameter of 20 mm.

<Preparation of First Surface-Treatment Liquid>

An isocyanate compound (MDI) (10 parts) was added to N,N-dimethylformamide (DMF) (100 parts), followed by mixing for dissolution, to thereby prepare a first surface-treatment liquid.

<Surface Treatment of Roller>

When the first surface-treatment liquid was maintained at 23° C., the above-produced roller was immersed in the liquid for 30 seconds. After immersion, n-hexane (100 parts) serving as a second surface-treatment liquid was gently added to the first surface-treatment liquid, to thereby form separate phases, and the roller was drawn up at 250 mm/min. The roller was heated for one hour in an oven maintained at 120° C., to thereby form a surface-treated layer, whereby a conductive roller was produced.

Example 2

<Preparation of First Surface-Treatment Liquid>

An isocyanate Compound (HDI) (10 parts) was added to N-methylpyrrolidone (100 parts), followed by mixing for dissolution, to thereby prepare a first surface-treatment liquid.

<Surface Treatment of Roller>

When the first surface-treatment liquid was maintained at 23° C., the roller produced in Example 1 (before surface treatment) was immersed in the liquid for 30 seconds. After immersion, n-hexane (100 parts) was gently added to the first surface-treatment liquid, to thereby form separated phases, and the roller was drawn up at 250 mm/min. The roller was heated for one hour in an oven maintained at 120° C., to thereby form a surface-treated layer, whereby a conductive roller was produced.

Example 3

<Production of Roller>

Epichlorohydrin rubber (Epichlomer CG-102, product of Daiso Co., Ltd.) (100 parts), tetraethylammonium perchlorate (Kanto Chemical Co., Inc.) (0.5 parts) serving as a conducting agent, di(2-ethylhexyl)phthalate (DOP) (3 parts) serving as a plasticizer, zinc oxide (ZnO) (5 parts), and 2-mercaptoimidazoline (Accel-22) (2 parts) serving as a vulcanizer were kneaded by means of a roll mixer, and the kneaded product was press-formed on the surface of a metallic shaft (φ: 6 mm). The outer surface of the thus-coated shaft was polished, to thereby produce a roller (before surface treatment) having an outer diameter of 12 mm and a rubber elastic member on the shaft surface.

<Preparation of First Surface-Treatment Liquid>

A prepolymer (Adiprene L100, product of Uniroyal) (10 parts) was added to acetonitrile (100 parts), followed by mixing for dissolution, to thereby prepare a first surface-treatment liquid.

<Surface Treatment of Roller>

When the first surface-treatment liquid was maintained at 23° C., the thus-produced roller was immersed in the liquid for 60 seconds. After immersion, cyclohexane (100 parts) serving as a second surface-treatment liquid was gently added to the first surface-treatment liquid, to thereby form separate phases, and the roller was drawn up at 250 mm/min. The roller was heated for one hour in an oven maintained at 120° C., to thereby form a surface-treated layer, whereby a conductive roller was produced.

Example 4

<Preparation of Third Surface-Treatment Liquid>

Acetonitrile (100 parts), acetylene black (Denki Kagaku Kogyo K.K.) (3 parts), an acrylic fluoropolymer (Modiper F600, product of Nippon oil & Fats Co., Ltd.) (1 part), an acrylic silicone polymer (Modiper FS700, product of Nippon oil & Fats Co., Ltd.) (1 part), and polyethylene glycol diallyl ether (molecular weight: 450) (1.5 parts) were mixed for three hours by means of a ball mill, to thereby produce an acetylene black dispersion. To the dispersion, a prepolymer (Adiprene L100, product of Uniroyal) (10 parts) was added, followed by mixing for dissolution, to thereby prepare a third surface-treatment liquid.

<Surface Treatment of Roller>

When the first surface-treatment liquid of Example 1 was maintained at 23° C., the thus-produced roller was immersed in the liquid for 60 seconds. After immersion, cyclohexane serving as a second surface-treatment liquid (100 parts) was gently added to the first surface-treatment liquid, to thereby form separate phases. The roller was drawn up from the first surface-treatment liquid at 250 mm/min and maintained in the second surface-treatment liquid for 10 seconds. Subsequently, the roller was transferred from the second surface-treatment liquid to the third surface-treatment liquid, where the roller was immersed for 60 seconds. The roller was drawn up again from the third and second surface-treatment liquids at 250 mm/min and heated for one hour in an oven maintained at 120° C., to thereby form a surface-treated layer, whereby a conductive roller was produced.

Comparative Example 1

The procedure of Example 1 was repeated, except that n-hexane was not added, to thereby produce a conductive roller.

Comparative Example 2

The procedure of Comparative Example 1 was repeated, except that the surface of the roller that had been immersed in the first surface-treatment liquid was wiped with a n-hexane-absorbed sponge, to thereby produce a conductive roller.

Comparative Example 3

The procedure of Example 3 was repeated, except that cyclohexane was not added, to thereby produce a conductive roller.

Comparative Example 4

The procedure of Example 3 was repeated, except that a roller which had been immersed in the first surface-treatment liquid was removed and, sequentially, immersed for 60 seconds in cyclohexane maintained at 23° C., to thereby produce a conductive roller.

Comparative Example 5

The procedure of Comparative Example 4 was repeated, except that acetonitrile was used instead of cyclohexane, to thereby produce a conductive roller.

Test Example 1

Measurement of Micro-Hardness of Roller

Micro-hardness (Hs) of each of the untreated conductive rollers and the conductive rollers of the Examples and the Comparative Examples was determined by means of a micro-hardness tester (MD-1, product of Koubunshi Keiki Co., Ltd.). The results are shown in Tables 1 and 2.

Test Example 2

Measurement of Electrical Resistance of Roller

The electrical resistance of each of the untreated conductive rollers and conductive rollers produced in the Examples and Comparative Examples was measured under application a voltage of 100 V. Electrical resistance was measured in the following manner. Specifically, each conductive roller was placed on an electrode member formed of a SUS 304 plate, and a load of 500 g was applied to each end of the roller. In this state, electrical resistance between the metal shaft and the electrode member after voltage application for 30 seconds was measured by means of ULTRA HIGH RESISTANCE METER R8340A (product of Advantest) under normal temperature-normal humidity conditions (NN; 23° C., 55% RH). Electrical resistance was measured at eight positions along the circumferential direction by rotating the roller with a unit rotation angle of 45°, and the maximum, minimum, and average values were determined. The results are shown in Tables 1 and 2.

Test Example 3

Observation of Surface State

The surface state of each of the conductive rollers produced in the Examples and Comparative Examples was visually observed. The surface state was evaluated by the following ratings: good (O), fair (Δ), and poor (X). The results are shown in Tables 1 and 2.

Test Example 4

Image Evaluation

Each of the conductive rollers produced in Examples 1 and 2 and Comparative Examples 1 and 2 and serving as development rollers, and each of the conductive rollers produced in Example 3 and Comparative Examples 3 to 5 and serving as charge-imparting rollers were installed in a commercial laser printer (MICROLINE 9600PS, product of Oki Data). An image was output by operating the printer under the conditions of 23° C. and 55% RH (NN), and the quality of the output images after passage of 10,000 sheets was visually evaluated in terms of the following ratings: excellent (O), fair (Δ), and poor (X). The surface state of the roller was also visually observed. The results are also shown in Tables 1 and 2.

TABLE 1

|  | Urethane substrate | Ex. 1 | Ex. 2 | Comp. Ex. 1 | Comp. Ex. 2 |
|---|---|---|---|---|---|
| Micro-hardness(°) | 52.0 | 54.5 | 53.8 | 57.5 | 54.3 |
| Electrical resistance(Ω) | $7.24 \times 10^6$ | $8.35 \times 10^7$ | $8.00 \times 10^7$ | $3.43 \times 10^8$ | $8.90 \times 10^7$ |
| Electrical resistance (MAX/MIN ratio) | 5 | 4 | 3 | 4 | 98 |
| Surface state | — | O good | O good | O good | X uneven wiping |
| Image evaluation | — | O good | O good | X cracking on roller surface | X uneven color density |

TABLE 2

|  | Epichlo substrate | Ex. 3 | Ex. 4 | Comp. Ex. 3 | Comp. Ex. 4 | Comp. Ex. 5 |
|---|---|---|---|---|---|---|
| Micro-hardness(°) | 46.2 | 48.4 | 49.5 | 52.8 | 49.3 | 47.5 |
| Electrical resistance(Ω) | $5.94 \times 10^5$ | $8.19 \times 10^5$ | $3.32 \times 10^5$ | $1.87 \times 10^6$ | $7.87 \times 10^5$ | $7.64 \times 10^5$ |
| Electrical resistance (MAX/MIN ratio) | 5 | 3 | 4 | 4 | 18 | 26 |

TABLE 2-continued

|  | Epichlo substrate | Ex. 3 | Ex. 4 | Comp. Ex. 3 | Comp. Ex. 4 | Comp. Ex. 5 |
|---|---|---|---|---|---|---|
| Surface state | — | ○ good | ○ good | ○ good | Δ uneven treatment | Δ uneven treatment |
| Image evaluation | — | ○ good | ○ good | X cracking on roller surface, photoreceptor damaged | Δ uneven color density | X uneven color density, OPC stained |

Results:

The conductive rollers of Examples 1 and 2, which had been produced through impregnating a rubber member with the first surface-treatment liquid containing an isocyanate compound and an organic solvent, and sequentially treating, without exposure to air, the surface of the rubber member with the second surface-treatment liquid, were found to exhibit a micro-hardness and an electrical resistance lower than those of the conductive roller of Comparative Example 1, produced through a conventional surface treatment.

The conductive roller of Example 3, which had been produced through impregnating a rubber member with the first surface-treatment liquid containing an isocyanate compound and an organic solvent, and sequentially treating, without exposure to air, the surface of the rubber member with the second surface-treatment liquid, were found to exhibit a micro-hardness and an electrical resistance lower than those of the conductive roller of Comparative Example 3, produced through a conventional surface treatment. Also, the conductive roller of Example 4, which had been surface-treated sequentially with the first, second, and third surface-treatment liquids, was found to exhibit lowered micro-hardness and electrical resistance. The quality of the printed images obtained with the rollers of Examples 1 to 4 after passage of 10,000 sheets was good. In contrast, cracking of the surface of the conductive roller of Comparative Example 1 occurred, and the conductive roller of Comparative Example 3 caused damage to the surface of a photoreceptor. The quality of the printed images obtained with both comparative rollers was poor.

The conductive roller of Comparative Example 2, produced through immersion of a roller in the first surface-treatment liquid and wiping the roller surface with a n-hexane-absorbed sponge, exhibited a micro-hardness and an electrical resistance which were lowered to be equivalent to those of the conductive rollers of Examples 1 and 2. However, the electrical resistance of the conductive roller of Comparative Example 2 varied considerably, possibly due to unevenness of wiping, depending on the measurement site. In image evaluation, unevenness of color density was observed in printed images, which was rated poor.

The conductive roller of Comparative Example 4, produced through immersion of a roller in the first surface-treatment liquid and further immersion in cyclohexane for 60 seconds, exhibited a micro-hardness and an electrical resistance which were lower than those of the conductive roller of Comparative Example 3, produced through a conventional surface treatment. However, since a roller in a non-uniform semi-dried state was immersed in a solvent, the roller surface exhibited unevenness in treatment, resulting in slight unevenness in electrical resistance. In image evaluation, slight unevenness of color density was observed in printed images, which was rated poor.

The conductive roller of Comparative Example 5, produced through immersion of a roller in the first surface-treatment liquid and further immersion in acetonitrile for 60 seconds, exhibited a micro-hardness and an electrical resistance which were lower than those of the conductive roller of Comparative Example 4. Similar to the conductive roller of Comparative Example 4, the roller surface exhibited unevenness in treatment, resulting in slight unevenness in electrical resistance. In image evaluation, unevenness of color density was observed in printed images, which was rated poor. In addition, since the roller was immersed in acetonitrile, the density of the isocyanate component of the surface-treated layer was thought to decrease excessively. In fact, an OPC was stained by a plasticizer.

As described hereinabove, through carrying out a method for performing surface treatment of a rubber member, the method comprising impregnating a rubber member with a first surface-treatment liquid containing an isocyanate component and an organic solvent, to thereby form a first impregnation layer, and sequentially treating a surface of the rubber member, without exposure to air, with a second surface-treatment liquid for partially removing the isocyanate component present in the first impregnation layer, there can be provided a rubber member which has low hardness in response to deformation and which does not cause staining of an OPC and other members and leakage.

What is claimed is:

1. A method for performing surface treatment of a rubber member, the method comprises impregnating a rubber member with a first surface-treatment liquid containing an isocyanate component and an organic solvent, to thereby form a first impregnation layer, and sequentially treating a surface of the rubber member, without exposure to air, with a second surface-treatment liquid for partially removing the isocyanate component present in the first impregnation layer.

2. A method for performing surface treatment of a rubber member according to claim 1, wherein the rubber member is immersed in a liquid layer formed of the first surface-treatment liquid, to thereby form the first impregnation layer, and, subsequently, the rubber member is transferred from the liquid layer formed of the first surface-treatment liquid to a liquid layer formed of the second surface-treatment liquid, the two layers forming separate phases.

3. A method for performing surface treatment of a rubber member according to claim 2, wherein the rubber member is immersed in the first surface-treatment liquid, a liquid layer formed of the second surface-treatment liquid is provided on the liquid layer formed of the first surface-treatment liquid, and the rubber member is drawn up through the second surface-treatment liquid.

4. A method for performing surface treatment of a rubber member according to claim 2, wherein the organic solvent is a polar aprotic solvent.

5. A method for performing surface treatment of a rubber member according to claim 4, wherein the second surface-treatment liquid is a non-polar solvent.

6. A method for performing surface treatment of a rubber member according to claim 1, wherein, after treatment with the second surface-treatment liquid, the rubber member is impregnated with a third surface-treatment liquid for forming a second impregnation layer, and a surface of the rubber member is sequentially treated, without exposure to air, with the second surface-treatment liquid.

7. A method for performing surface treatment of a rubber member according to claim 1, wherein, after treatment with the second surface-treatment liquid, a surface of the rubber member is sequentially treated with a fourth surface-treatment liquid for partially removing the isocyanate component present in the first impregnation layer.

8. A method for performing surface treatment of a rubber member according to claim 6, wherein the third surface-treatment liquid contains at least one element selected from among an isocyanate compound, a conductivity-imparting material, an acrylic fluoropolymer, and an acrylic silicone polymer.

* * * * *